United States Patent
Cooke et al.

[11] Patent Number: 5,154,761
[45] Date of Patent: Oct. 13, 1992

[54] HIGH DEFINITION IMPULSE INK JET INK COMPOSITIONS

[75] Inventors: Theodore M. Cooke, Danbury; Alexander J. Fekete, Jr., Southport, both of Conn.

[73] Assignee: Trident, Inc., Brookfield, Conn.

[21] Appl. No.: 647,426

[22] Filed: Jan. 28, 1991

[51] Int. Cl.$^5$ .................................. C09D 11/02
[52] U.S. Cl. .................................. 106/22; 106/20
[58] Field of Search .......................... 106/20, 22

[56] References Cited

U.S. PATENT DOCUMENTS

| | | | |
|---|---|---|---|
| 3,705,043 | 12/1972 | Zabiak | 106/22 |
| 3,846,141 | 11/1974 | Ostergren et al. | 106/22 |
| 4,142,905 | 3/1979 | Cooke | 106/22 |
| 4,229,219 | 10/1980 | Metz | 106/22 |
| 4,256,493 | 3/1981 | Yokoyama et al. | 106/22 |
| 4,295,889 | 10/1981 | Eida et al. | 106/22 |
| 4,361,843 | 11/1982 | Cooke et al. | 106/22 |
| 4,381,946 | 5/1983 | Uehara et al. | 106/22 |
| 4,386,961 | 6/1983 | Lin | 106/22 |
| 4,396,429 | 8/1983 | Matsumoto et al. | 106/22 |
| 4,426,226 | 1/1984 | Ohta et al. | 106/22 |
| 4,793,860 | 12/1988 | Murakami et al. | 106/22 |

*Primary Examiner*—Mark L. Bell
*Assistant Examiner*—Helene Klemanski
*Attorney, Agent, or Firm*—Woodcock Washburn Kurtz Mackiewicz & Norris

[57] ABSTRACT

Impulse-type ink jet ink compositions are provided along with processes for recording information therewith. The ink compositions preferably comprise from about 65 to about 80 percent by weight of a low molecular weight diol, from about 15 to about 25 percent by weight of a low molecular weight diol ether, and from about 1 to about 15 percent by weight of a colorant. The ink compositions are suitable for printing clear, well-defined alphanumeric text or bar codes on porous substrates such as kraft paper corrugated cardboard.

15 Claims, 1 Drawing Sheet

HIGH DEFINITION IMPULSE INK JET IN COMPOSITIONS

FIELD OF THE INVENTION

The present invention relates to ink compositions for use in drop-on-demand or impulse-type ink jet printers and, more specifically, to impulse-type inks which produce well-defined images on porous substrates.

BACKGROUND OF THE INVENTION

Ink jet printing is performed by discharging ink droplets from a print head to a substrate. The droplets are ejected through orifices or nozzles in the print head and are directed to the substrate to form an image thereon. In contrast to many other types of printing, there is no contact between the printer and the substrate in ink jet techniques.

Most of the ink jet printers known in the art may be characterized as either continuous or impulse devices, depending upon the mechanism by which the ink droplets are directed to the substrate. In continuous ink jet systems, an essentially uninterrupted stream of ink is ejected from a nozzle and breaks up into droplets. The droplets bear an electric charge so that they can be deflected by an applied electric field which is modulated according to the particular image to be recorded. The electric field directs the droplets toward either the substrate or an ink re-circulating reservoir. The inks employed in conjunction with continuous ink jet systems typically comprise a colorant such as a dye or pigment, an electrolyte to facilitate droplet deflection, and a liquid vehicle to dissolve or disperse the colorant and the electrolyte. While the vehicle in many continuous-type inks comprises water, U.S. Pat. No. 4,142,905, in the name of Cooke, disclosed a water-free ink composition consisting essentially of a low molecular weight glycol, an inorganic salt electrolyte, and a dye which is soluble in the glycol.

With so-called "impulse" or "drop-on-demand" ink jet printers, image formation is controlled by selectively energizing and de-energizing a piezoelectric transducer rather than by modulating an applied electric field. Ink is stored in the print head or nozzle until it is necessary to form an image on the substrate. The printer is then activated to apply pressure to the ink and discharge a selected number of discrete ink droplets toward the substrate. These ink droplets need not bear an electric charge. Accordingly, impulse ink compositions are free of corrosive substances such as water and electrolytes which continuous stream inks often comprise.

However, impulse ink jet printers present a number of problems which are not encountered in continuous ink jet systems. For example, unlike continuous ink jet printers, impulse printers typically are maintained in a stand-by or temporarily inoperative mode between printing cycles. Thus, the ink is allowed to stand and possibly solidify in the discharge orifices of the print head. Impulse printers normally begin a printing cycle with such material in place. Many of the start-up problems encountered with impulse printers are attributable to ink which has been allowed to stand in the discharge orifices during stand-by periods. Such material is less of a concern in continuous systems because there typically are fewer interruptions in the flow of ink. Even where ink is allowed to stand and solidify, it is more easily purged due to the considerably higher pressures at which continuous ink jet printers operate. Accordingly, impulse-type inks must be specially formulated to minimize start-up problems.

Numerous ink compositions for impulse ink jet printers are known in the art. However, many of these inks are not suitable for writing on porous or fibrous substrates. As will be appreciated by those of skill in the art, an ink applied to a substrate such as paper will tend to migrate or wick along the fibers of the paper until the wicking forces are countered by the ink viscosity. The extent to which the ink wicks will be dependent upon both its viscosity and the porosity of the substrate. Where highly porous substrates such as kraft paper or corrugated cardboard are employed, many inks tend to wick excessively, leading to blurry, ill-defined printed images. One approach to clearer, more well-defined print images has involved the employment of a rapidly evaporating ink vehicle. However, rapid evaporation of the vehicle of an impulse-type ink often leads to clogging of discharge orifices during stand-by periods. Moreover, rapid evaporation is undesired due to the adverse environmental and health effects of many commonly-employed ink vehicles.

In certain applications, it is necessary that the image created by an ink jet printer possess a relatively intense color. For example, many optical character reading devices cannot read images unless they possess a minimum color intensity. Those skilled in the art will recognize that bar code images typically must possess a print contrast signal (pcs) of about 90 or greater to be machine readable. However, many of the known techniques for increasing the color intensity of an ink—such as increasing the concentration of the colorant—often adversely affect important ink properties such as viscosity, surface tension, and stability.

Therefore, there exists a need for an impulse-type ink jet ink composition capable of producing clear, well-defined, color-intense images on even porous substrates.

SUMMARY OF THE INVENTION

The present invention provides impulse-type ink jet ink compositions which produce well-defined images on porous substrates such as kraft paper and corrugated cardboard. The ink compositions preferably comprise from about 65 to about 80 percent by weight of a low molecular weight diol, from about 15 to about 25 percent by weight of a low molecular weight diol ether, and from about 1 to about 15 percent by weight of a colorant. Even more preferred are ink compositions which comprise about 72 percent by weight of triethylene glycol, about 20 percent by weight of methoxytriglycol, and about 8 percent by weight of a colorant which comprises nigrosine black dye.

The present invention also provides processes for recording information on a substrate using the disclosed novel ink compositions. In preferred embodiments, the processes comprise the steps of providing the ink composition, ejecting one or more droplets of the ink composition from an orifice by the selective application of pressure, and contacting the droplets with a receiving surface on the substrate.

BRIEF DESCRIPTION OF THE DRAWINGS

The numerous objects and advantages of the present invention may be better understood by those skilled in the art by reference to the accompanying figures, in which.

DETAILED DESCRIPTION OF THE INVENTION

Figure 1:
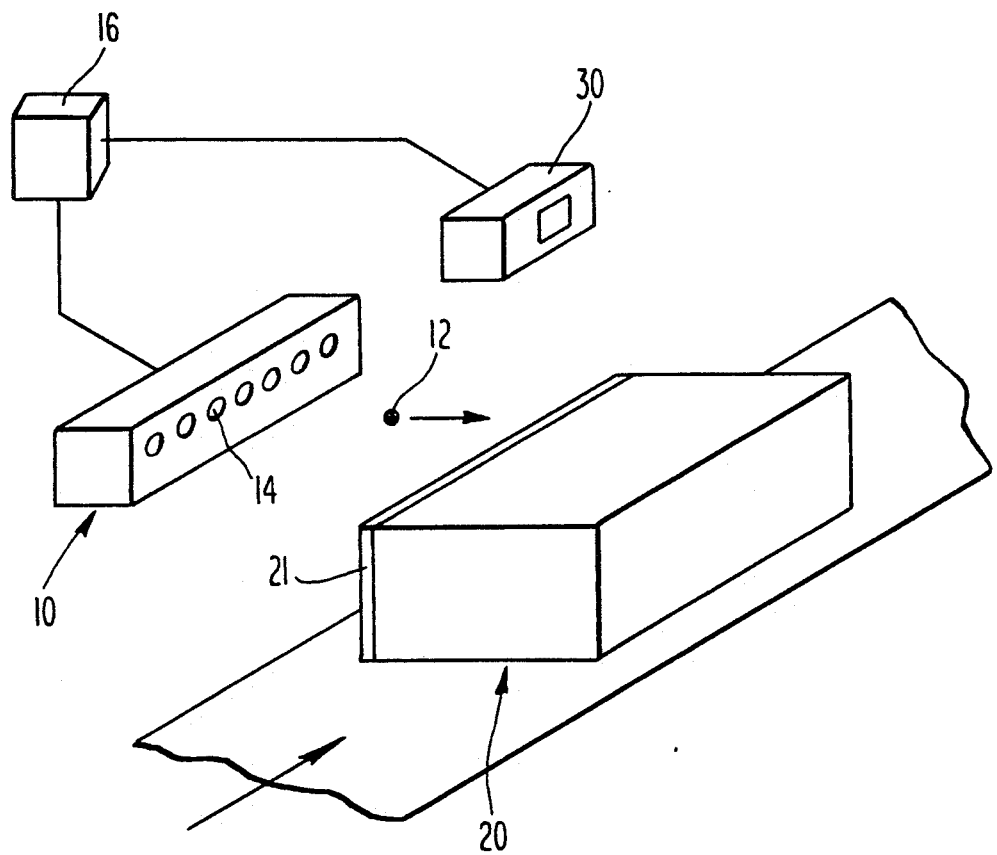
FIG. 1 depicts an impulse ink jet printing apparatus according to the present invention.

Ink compositions according to the present invention comprise from about 65 to about 80 percent by weight of a diol having a molecular weight less than about 400. Preferably, the diol constitutes from about 70 to about 75 percent by weight of the ink composition, more preferably about 72 percent by weight. The diol should have a liquid phase between about 20 and about 70° C., as this is the temperature range within which impulse-type ink jet printers are most commonly operated. The diol may comprise one or more of the many chemically distinct, low molecular weight diols known in the art, such as, for example, diethylene glycol, triethylene glycol, tetraethylene glycol, 1,8-hexanediol, 2-ethyl-1,3-hexanediol, and 1,5-pentanediol. Diethylene glycol, triethylene glycol, and tetraethylene glycol are preferred diols. Triethylene glycol is particularly preferred.

The ink compositions of this invention further comprise from about 15 to about 25 percent by weight of a diol ether having a molecular weight less than about 400. Preferably, the diol ether constitutes about 20 percent by weight of the ink composition. The diol ether should have a liquid phase between about 20 and about 70° C., as this is the temperature range within which impulse-type ink jet printers are most commonly operated. The diol ether may comprise one or more of the many chemically distinct, low molecular weight diol ethers known in the art, such as, for example, ethylene-glycol monomethyl ether, ethylene-glycol monethyl ether, diethylene-glycol monomethyl ether, diethylene-glycol monobutyl ether, 1-butoxyethoxy-2-propanol, diethylene-glycol monethyl ether, ethylene-glycol monobutyl ether, ethylene-glycol monohexyl ether, phenyl glycol ethers, butoxytriglycol, methoxytriglycol, and ethoxytriglycol. Polyoxyethylene glycols such as ethoxytriglycol and methoxytriglycol are preferred. Methoxytriglycol is particularly preferred.

The diol and the diol ether are selected to effectively dissolve the colorant present in the ink composition and to possess a relatively low rate of evaporation, preferably lower than that of butyl acetate. As will be appreciated by those of skill in the art, slowly evaporating liquid vehicles will generally present fewer problems in re-starting a printer which has been allowed to stand idle for a period of time.

Preferred ink compositions comprise from about 1 to about 15 percent by weight of a colorant. Preferably, the ink composition comprises from about 5 to about 10 percent by weight of a colorant, more preferably about 8 percent. The choice of colorant and its concentration principally depend on the solubility of the colorant in the vehicle and the intensity of its color for a particular application. The colorant is selected to render the ink composition visible to the human eye or some mechanical data collection device such as a bar code scanner or other type of optical character reader operating in the wavelength range of from about 400 to about 980 nanometers. Preferably, images produced by the ink composition have a print contrast signal greater than about 90. It will be recognized that print contrast signal is determined by subtracting the reflectance of the print from the reflectance of the paper and dividing the result by the reflectance of the paper.

Preferred colorants include Nigrosine base and typophor black dyes. These dyes are particularly suitable for use in the present ink compositions to produce infrared-readable images, since they have been found to have a wide spectrum absorption range of from at least 500 nm to 900 nm. Bar code print made using these inks has shown very good readability by an infrared reader operating at 940 nm and by a visible reader operating at 633 nm.

The ink compositions of this invention may further comprise one or more of the ink additives known in the art, so long as incorporation of the additive does not impair the clarity or definition of images printed with the ink.

The present invention also provides processes for recording information on a substrate with the above-described ink compositions. The recorded information may be in the form of alphanumeric text, bar codes, or other types of images or symbols, so long as the information is visually or mechanically readable.

A preferred process according to the present invention is depicted in FIG. 1, wherein one or more droplets (12) of the ink composition are ejected from orifices (14) by selectively energizing and de-energizing piezoelectric transducers (not shown) in a print head (10). The operation of the transducers and, hence, the ejection of the droplet is controlled by a processing means (16) such as a computer.

After ejection from the print head (10), the droplet (12) is directed to a receiving surface (21) on the substrate (20) to form a printed image. The printed image should be clear and well-defined, even on porous substrates such as kraft paper and corrugated cardboard. It will be recognized that the edge definition of a printed letter or character produced by an ink jet printer can be related to the capacity of the printer to form circular dots of perfect or near perfect circularity. It is preferred that the print images recorded in accordance with the present invention have circularity greater than about 0.7 and that said circularity be determined as set forth in U.S. Pat. No. 4,361,843 in the names of Cooke, et al., which is incorporated herein by reference.

Numerous printing substrates such as papers, glasses, metals, and plastics are known in the art to comprise receiving surfaces with which ink droplets may be contacted. It will be recognized that substrates can vary greatly in terms of physicochemical properties such as smoothness, porosity and surface treatment, and that such physicochemical properties will greatly influence the printing process and the choice of an ink composition. The ink compositions of the present invention have been found to form clear, well-defined images on kraft paper, corrugated cardboard, and other relatively porous substrates having a smoothness of about 300 to about 450 Sheffield units, preferably between about 345 and about 400 Sheffield units.

It is preferred that the processes of the present invention be performed at temperatures between about 20 and about 70° C., more preferably between about 30 and about 40° C. At these temperatures, suitable application viscosities of the ink compositions may be obtained. It is preferred that the ink have a viscosity between about 10 and about 15 cps at 60° C.

As shown in FIG. 1, the substrate (20) preferably has a component of movement transverse to the path of the droplet (12). Such relative movement may be produced by moving the substrate (20) past a stationary print head (10), as shown in FIG. 1, or by moving the print head past a stationary substrate. The accuracy and/or clarity of the recorded information optionally may be determined by reading the information with a mechanical data collection device (30) positioned upstream from the print head (10).

Additional objects, advantages, and novel features of this invention will become apparent to those skilled in the art upon examination of the following examples thereof, which are not intended to be limiting, wherein parts and percents are by weight unless otherwise indicated.

An ink composition was prepared by mixing triethylene glycol (72%), methoxytriglycol (20%), and Nigrosine black dye 8%. The ink composition had a viscosity of 11 cps. at 60° C. and was applied to kraft paper. The kraft paper had a wire side smoothness of about 400 Sheffield units and a felt side smoothness of about 345 Sheffield units. An ULTRAJET Model 96/32 liquid ink jet imaging print head, which is commercially available from Trident, Inc. of Brookfield, Conn., was employed to apply the ink as a series of bar codes. After drying, it was determined that the bar codes had a print contrast signal of about 85-91.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. An ink composition for use in impulse ink jet printers, comprising:
   from about 65 to about 80 percent by weight of a low molecular weight diol;
   from about 15 to about 25 percent by weight of low molecular weight diol ether; and
   from about 1 to about 15 percent by weight of a colorant;
   said ink composition being substantially free of water.

2. The ink composition of claim 1 wherein the diol constitutes between about 70 and about 75 percent by weight of the ink composition.

3. The ink composition of claim 1 wherein the diol constitutes about 72 percent by weight of the ink composition.

4. The ink composition of claim 1 wherein the diol comprises one or more diols selected from the group consisting of diethylene glycol, triethylene glycol, tetraethylene glycol, 1,8-hexanediol, 2-ethyl-1,3-hexanediol, and 1,5-pentanediol.

5. The ink composition of claim 1 wherein the diol comprises one or more diols selected from the group consisting of diethylene glycol, triethylene glycol, and tetraethylene glycol.

6. The ink composition of claim 1 wherein the diol comprises triethylene glycol.

7. The ink composition of claim 1 wherein the diol ether constitutes about 20 percent by weight of the ink composition.

8. The ink composition of claim 1 wherein the diol ether comprises one or more diol ethers selected from the group consisting of ethoxytriglycol and methoxytriglycol.

9. The ink composition of claim 1 wherein the diol ether comprises methoxytriglycol.

10. The ink composition of claim 1 wherein the colorant constitutes from about 5 to about 10 percent by weight of the ink composition.

11. The ink composition of claim 1 wherein the colorant constitutes about 8 percent by weight of the ink composition.

12. The ink composition of claim 1 wherein the colorant comprises Nigrosine black dye.

13. The ink composition of claim 1 wherein the colorant absorbs light having a wavelength between about 400 and about 980 nanometers.

14. The ink composition of claim 1 which has a viscosity between about 10 and about 15 centipoise at 60° C.

15. An ink composition for sue in impulse ink jet printers, comprising:
   from about 65 to about 80 percent by weight of a diol having a liquid phase between about 20 and about 70° C.;
   from about 15 to about 25 percent by weight of a polyoxyethylene glycol having a liquid phase between about 20 and about 70° C.; and
   from about 1 to about 15 percent by weight of a colorant;
   said ink composition begin substantially free of water.

* * * * *

UNITED STATES PATENT AND TRADEMARK OFFICE
CERTIFICATE OF CORRECTION

PATENT NO. : 5,154,761
DATED : October 13, 1992
INVENTOR(S) : Theodore M. Cooke and Alexander J. Fekete, Jr.

It is certified that error appears in the above-indentified patent and that said Letters Patent is hereby corrected as shown below:

Cover page, item [54], change "HIGH DEFINITION IMPULSE INK JET IN COMPOSITIONS" to --HIGH DEFINITION IMPULSE INK JET INK COMPOSITIONS--.

Column 1, line 1, change "HIGH DEFINITION IMPULSE INK JET IN COMPOSITIONS" to --HIGH DEFINITION IMPULSE INK JET INK COMPOSITIONS--.

Column 6, line 38, change "sue" to --use--.

Signed and Sealed this

Seventeenth Day of February, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,154,761
DATED : October 13, 1992
INVENTOR(S) : Theodore M. Cooke; Alexander J. Fekete, Jr.

It is certified that error appears in the above-indentified patent and that said Letters Patent is hereby corrected as shown below:

Claim 1, column 5, line 52, insert --a-- before the phrase "low molecular weight diol ether"; and Claim 15, column 6, line 48, change "begin" to --being--.

Signed and Sealed this

First Day of June, 1999

Attest:

Q. TODD DICKINSON

Attesting Officer

Acting Commissioner of Patents and Trademarks